Sept. 14, 1937.                     W. P. GEE                     2,092,968
                                   FILTRATION
                              Filed April 25, 1932
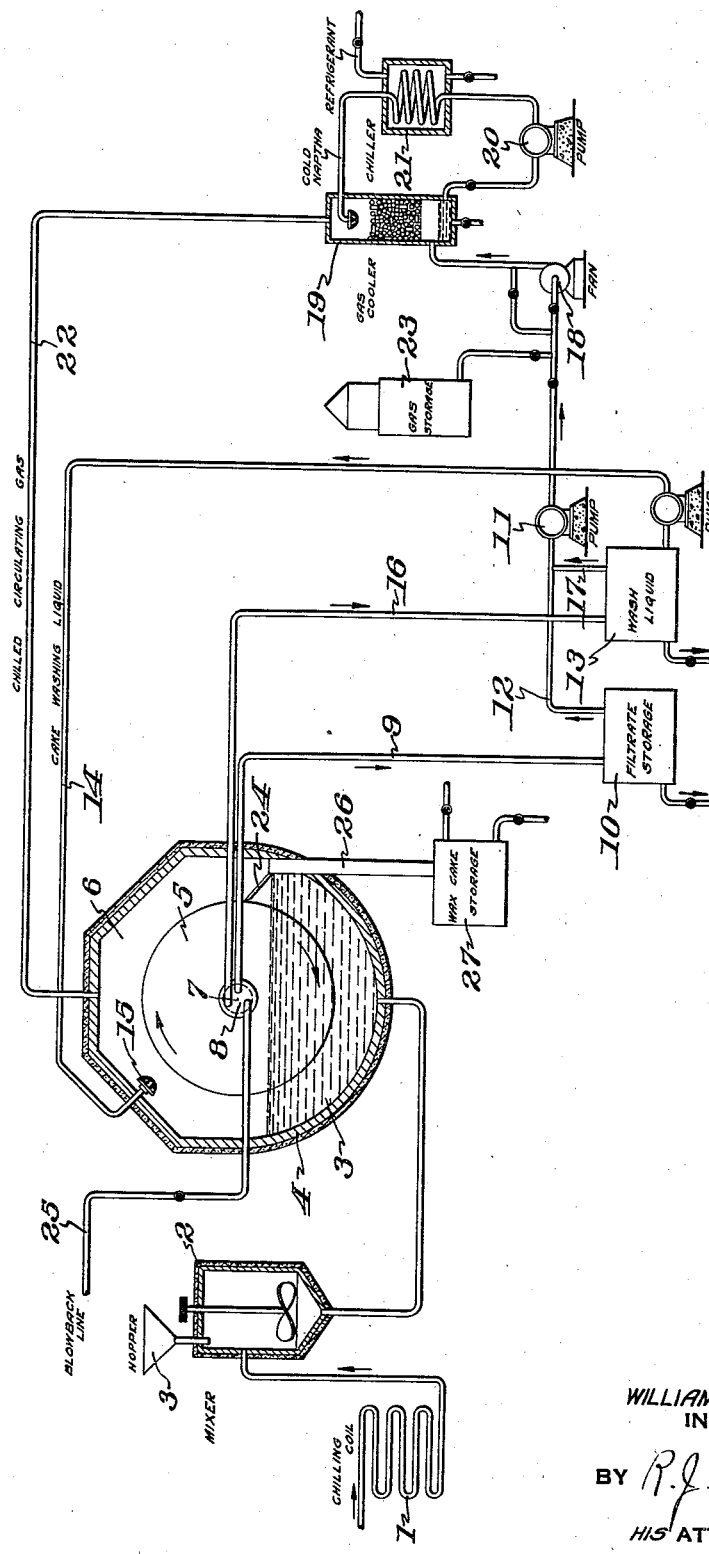
WILLIAM P. GEE
INVENTOR
BY R. J. Dearborn
HIS ATTORNEY Patented Sept. 14, 1937

2,092,968

UNITED STATES PATENT OFFICE 2,092,968

FILTRATION

William P. Gee, Plainfield, N. J., assignor to The Texas Company, New York, N. Y., a corporation of Delaware Application April 25, 1932, Serial No. 607,270

8 Claims. (Cl. 196—19)

This invention relates to an improved process of filtration which is particularly adapted for filtering waxy constituents from hydrocarbon oil.

The invention contemplates a process of filtering solid hydrocarbons or paraffin wax from liquid hydrocarbons comprising consecutively submerging a hollow filtering surface within a cold mixture of solid and liquid hydrocarbons during which solid hydrocarbons are deposited on the surface to form a filter cake while the liquid flows through the surface into its interior, then moving the surface out of the mixture through a zone of cake washing, drying and discharge while maintaining the filter cake and filtering surface at a temperature below that at which the solid hydrocarbons tend to soften or liquefy. During passage of the filter surface through this zone, chilled gas is forced through the cake and the filter surface to maintain the cake and surface in a cold condition thus preventing softening or re-solution of the wax in the liquid contained in the cake, or applied thereto as a wash, with consequent penetration and plugging of the filter fabric by the dissolved waxy material.

My invention may be employed in connection with either continuous or intermittent filters. One form of filter may, for example, comprise a hollow rotating cylinder or hollow rotating leaves with means for creating vacuum within the interior of the filter element or for exerting positive pressure upon the exterior thereof.

In operation, the rotating cylinder is kept partially submerged in the filtering mixture. Solids are deposited on the submerged portion of the surface to form a cake while liquid flows through the surface into the interior of the cylinder from which it is withdrawn as filtrate. As the cylinder rotates the cake is exposed whereupon it may be dried and washed by applying solvent liquid to the surface of the cake, preferably in the form of a spray, the liquid being drawn through the cake into the interior of the cylinder for removal. The cake may be subjected to further drying to remove remaining wash liquid following which the cake is removed, usually by applying a slight reverse pressure to the interior of the filtering element causing distention of the fabric and consequent loosening of the cake, complete removal of which is facilitated by suitable scraping means located adjacent to the exterior surface of the filter fabric.

Experiments have indicated that when attempting to filter precipitated wax from cold wax-bearing oil, or mixtures of such oil and solvent, with a continuous or intermittent type of filter where change of temperature is involved, the initial filtering rate may be fairly high but it almost immediately decreases and drops off exceedingly rapidly. This is due to plugging up of the pores or interstices of the filter fabric with waxy material which has become liquid and penetrated the fabric during the time the cake and filter surface is exposed in the relatively warmer zone above the cold filtering mixture.

During this time the filter cake and the filter cloth or fabric become substantially warmer due to contact with the surrounding atmosphere, particularly during the cake drying operation where air or gas is drawn through the cake and the cloth from the relatively warmer surroundings. Contact with the warmer gas and exposure to the warm surroundings causes the wax to soften and redissolve in the oil adhering to or absorbed in the cake, or in the wash liquid, and this solution penetrates the fabric or filtering medium along with the gas or air which is being drawn therethrough. Upon submergence of the fabric in the cold mixture in the bowl of the filter, solidification of this wax occurs within the interstices of the fabric and also within the fibres of the fabric itself. Consequently, the filtering surface soon becomes substantially completely plugged and filtration is rendered practically impossible.

I have found that by completely enclosing and surrounding the exposed filtering surface, and circulating chilled gas through the surface during the time it is out of contact with the cold filtering mixture so as to maintain the temperature of the cake as well as that of the fabric at substantially that of the cold mixture, or nearly so, I am able to prevent the aforementioned plugging effect. By this means, I am able to maintain a continual high economic rate of filtration.

In order to better understand the invention, reference will now be made to the accompanying flow diagram forming a part of this specification, which illustrates a preferred embodiment of my invention.

In carrying out the invention, the wax-bearing mineral oil, such as cylinder stock, is advantageously mixed with a solvent liquid or wax-precipitating medium. This solvent liquid may comprise a light petroleum fraction, such as naphtha or various other organic solvent liquids, or mixtures thereof, including alcohols, ketones, aldehydes, cyclic hydrocarbons, benzol or its homologs, or derivatives of these various materials.

The mixture of oil and solvent liquid is delivered from a source not shown in the diagram and conducted through a chilling coil 1 wherein it may be cooled to a temperature of around 0° F. or below. The chilled mixture is then introduced to a mixer 2 wherein it is admixed if desired, with a comminuted solid filter-aid material introduced to the mixer from a hopper 3. The mixer is preferably provided with a jacket into which a refrigerant may be introduced, or through which it may be circulated in order to maintain the mixture in a chilled condition.

This chilled mixture of oil, precipitated wax and filter-aid material is then conducted to the bowl 3 of a filter 4. This filter is advantageously of the continuous rotating drum type, somewhat similar in general principles to that employed heretofore in industrial filtration. The exterior of the filter shell is covered with heat-insulating material to facilitate maintaining the interior in a cool condition.

During rotation of the hollow drum 5, the cylindrical surface thereof, comprising a filtering surface or medium formed from cloth or metal fabric or any porous filtering material, passes through the body of filtering mixture maintained in the bowl 3 of the filter, and then emerges therefrom during passage through the upper and hooded portion 6 of the filter.

The precipitated wax and admixed filter-aid material is deposited upon the exterior and submerged portion of the surface to form a filter cake, while the solvent and dissolved oil are forced through the filter surface into the interior of the drum. The liquid within the interior of the drum is withdrawn therefrom through the hollow rotating shaft 7, the filter valve 8, the pipe 9 in communication therewith, and into a filtrate storage tank 10. The tank 10 is maintained under a reduced pressure by means of vacuum exerted through a vacuum pump 11 communicating with the top of the tank through a pipe 12.

When that portion of filter surface over which filter cake is deposited emerges from the cold filtering mixture into the hooded portion of the filter, the application of vacuum upon the interior of that portion of the surface is continued for the purpose of removing mother liquor contained in the cake. Upon further rotation, a spray of washing liquid, such as naphtha, for example, from a tank 13 is applied to the surface of the filter cake through a pipe 14 and a spray nozzle 15 positioned within the hood 6 adjacent to the filter cake. This spray liquid is drawn through the cake into the interior of the drum and is separately withdrawn therefrom through the hollow shaft 7, filter valve 8 and pipe 16 into the storage tank 13. The vacuum pump 11 also communicates with the tank 13 by means of a pipe 17 for the purpose of creating a vacuum in the tank and also within the interior of the filter drum. This vacuum is continued after the filter cake has advanced beyond the spray nozzle 15 to permit drying the cake and maintaining it in a cold condition by drawing cold gas therethrough as will now be explained in more detail.

While the vacuum pump 11 is shown as taking direct suction on the tanks 10 and 13, it may be advantageous to interpose a foam trap between these tanks and the vacuum pump to remove entrained matter from the gas. Such a trap is preferably mounted about 35 or 40 feet above the tank and provided with a water leg through which liquid matter removed in the trap may be drawn off.

The exhaust gases from the vacuum pump 11 are advantageously conducted directly to a gas cooler 19. If desired, a fan or blower 18 may be used to reduce the back pressure on the vacuum pump.

The cooler 19 comprises a column packed with Raschig rings or other suitable packing means. Cooling liquid, preferably the solvent being used such as cold naphtha, at a temperature, for example, of about —40° F., is sprayed over the packing by which means it is brought into intimate contact with the gas passing upwards therethrough. The naphtha collecting in the bottom of the column, and at a temperature of about 40° F., is withdrawn by a pump 20 and passed through a chiller 21 wherein it is again chilled by interchanging heat with a refrigerant. Liquid ammonia may be expanded into the shell of the chiller to effect the necessary refrigeration.

The temperature to which the naphtha is chilled depends on the extent to which it is desired to cool the gas, and this in turn depends upon the character of the solid material being filtered. Usually it is desirable to keep the cake at substantially the same temperature as the filtering mixture. By maintaining the bottom of the column at a temperature above 32° F. any water removed from the gas may be withdrawn from the bottom of the column. It is desirable to keep the circulating gas free from water which might penetrate the cake and the fabric and deter filtration.

The chilled gas at a temperature, for example, of about —30° F., is then conducted through a pipe 22 to the hood 6 of the filter wherein it surrounds the filtering surface during its emergence from the filtering solution. This chilled gas is forced through the filter fabric prior to and subsequent to the removal of the filter cake therefrom. In this way, the cake and the filter surface is continually maintained at a temperature substantially nearly the same as that of the cold mixture undergoing filtration; for example, in this case at a temperature of from about 0° F. to —10° F.

To take care of gas losses, fresh gas may be drawn from the storage tank or gasometer 23 by the fan 18. The gas referred to herein may include air, flue gas, hydrocarbon vapor, fixed gases, such as nitrogen and so forth. I have found it of advantage to use flue gas which is relatively inexpensive.

The cake is discharged from the filter surface after washing and drying by introducing, for a short period of time, a positive gas pressure to the interior of the particular segment of the filter drum in question, causing the filter fabric to bulge and loosen the cake which is then removed therefrom by scrapers 24. This reverse gas pressure may be effected by introducing chilled gas through the filter valve 8 from a line 25 leading from a suitable source of supply, as for example, the cooler 19.

The dislodged cake removed from the filter surface falls through the chutes 26 into a closed storage tank 27 from which it may be withdrawn for further treatment including the removal therefrom of retained oil and solvent as well as for the separation and recovery of the filter-aid material.

While a vacuum type of continuous filter has been described, it is contemplated that the invention is equally well adapted to pressure filtration wherein superatmospheric pressures may be maintained on the exterior of the filtering surface.

The invention is not limited to the filtration of wax from wax-bearing oils but is adapted to filtering other types of solid materials from liquids and wherein it is desirable to maintain the resulting cake of solids at a temperature below that at which the solids tend to liquefy and reach a condition where they penetrate the fabric and ultimately result in plugging.

Obviously many modifications and variations of the invention, as hereinbefore set forth, may be made without departing from the spirit and scope thereof, and therefore only such limitations should be imposed as are indicated in the appended claims.

I claim:

1. In the continuous process of dewaxing mineral oil by continuously filtering the chilled wax-bearing mixture at temperatures of around 0° F. or lower, and wherein a filtering surface consecutively submerges within the chilled mixture during which formation of the wax filter cake occurs, and then emerges from the chilled mixture during which said cake is washed, dried and discharged therefrom, the method of preventing penetration and plugging of the filtering surface with wax which comprises surrounding the unsubmerged portion of said filtering surface, including the filter cake formed thereon, with refrigerated gas at a temperature of around 0° F. to −30° F., and forcing said gas through the unsubmerged filter surface both prior to and subsequent to the discharge of the cake in a quantity sufficient to uniformly maintain the unsubmerged portion of the filtering surface at a temperature not substantially above that of the cold filtering mixture.

2. In the continuous process of dewaxing mineral oil by continuously filtering the chilled wax-bearing mixture at temperatures of around 0° F. or lower, and wherein a filtering surface consecutively submerges within the chilled mixture during which formation of the wax filter cake occurs, and then emerges from the chilled mixture during which said cake is washed, dried and discharged therefrom, the method of preventing penetration and plugging of the filtering surface with wax which comprises surrounding the unsubmerged portion of said filtering surface, including the filter cake formed thereon, with refrigerated hydrocarbon vapor at a temperature of around 0° F. to −30° F., and forcing said vapor through the unsubmerged filter surface both prior to and subsequent to the discharge of the cake in a quantity sufficient to uniformly maintain the unsubmerged portion of the filtering surface at a temperature not substantially above that of the cold filtering mixture.

3. In the continuous process of dewaxing mineral oil by continuously filtering the chilled wax bearing mixture at temperatures of around 0° F. or lower, and wherein a wax filter cake is continuously formed on a movable filtering surface which consecutively submerges within the chilled mixture, and then emerges from the chilled mixture during which said cake is continuously dried and discharged therefrom, the method of maintaining the filtering surface at all times at a temperature approximating the temperature of the chilled wax bearing mixture being filtered whereby to prevent plugging of the filtering surface with wax, which comprises surrounding exposed portions of the filtering surface with a confined cold gaseous atmosphere of comparatively small volume in comparison to the surface area of the filtering surface and of the order of the volume of the unfiltered liquid maintained within the filter unit, continuously passing a portion of the confined gas through the filtering surface to assist removal of liquid from the wax cake, continuously replenishing the confined gaseous atmosphere to make up for that passing through the filtering surface, and maintaining the temperature of the confined gaseous atmosphere approximating that of the chilled wax bearing mixture being filtered by control of the temperature of the make-up gas.

4. The method of continuously separating wax from a wax slurry on a rotary filter element mounted within a filter casing having an enclosing cover, which comprises immersing said element in a wax slurry under a pressure differential sufficient to force filtrate through the element and to build up a wax cake thereon, removing said filter cake from the slurry, washing said filter cake, drying said cake by means of a stripping gas, continuously removing said cake from said element, and introducing a stripping medium into said casing to provide a chilled gaseous atmosphere therein between said filter casing with enclosing cover and said filter element, which gaseous atmosphere is at a temperature approximating that of the wax slurry being filtered and which supplies said stripping gas.

5. The method of continuously separating wax from a wax slurry on a rotary filter element mounted within a filter casing having an enclosing cover, which comprises immersing said element in a wax slurry under a pressure differential sufficient to force filtrate through the element and to build up a wax cake thereon, removing said filter cake from the slurry, washing said filter cake, drying said cake by means of a stripping gas, continuously removing said cake from said element, introducing a stripping medium into said casing to provide a chilled gaseous atmosphere therein between said filter casing with enclosing cover and said filter element, which gaseous atmosphere is at a temperature approximating that of the wax slurry being filtered and which supplies said stripping gas, separating stripping gas passed through the filter element from liquid filtrate associated therewith, conditioning said separated gas to form the stripping medium, and returning the conditioned stripping medium to the filter casing to maintain the said chilled gaseous atmosphere therein.

6. The method as defined in claim 4, in which the gas is a chilled and dehydrated flue gas.

7. The method as defined in claim 5, in which the gas is a flue gas, and in which the conditioning of the separated gas prior to its return to the gaseous atmosphere surrounding the filter element is by chilling to a temperature substantially below that required to remove moisture from the gas.

8. The method as defined in claim 4, in which hydrocarbon vapor provides the chilled gaseous atmosphere surrounding the filtering surface.

WILLIAM P. GEE.